Patented June 20, 1944

2,351,998

UNITED STATES PATENT OFFICE 2,351,998

PROCESS OF PRODUCING MAGNESIUM OXIDE

Wilhelm Moschel and Willi Forst, Bitterfeld, and Walther Schmid, Stassfurt, Germany; vested in the Alien Property Custodian No Drawing. Application July 23, 1940, Serial No. 347,040. In Germany April 26, 1939

5 Claims. (Cl. 23—201)

This invention relates to a process of producing magnesium oxide of uniformly high reactivity.

It has already been observed (cf. e. g. Steiner und Hüttig, "Die Abhängigkeit der katalytischen Wirksamkeit verschiedener Magnesiumoxyde von ihrer Darstellungsart und Vorgeschichte" in "Die Kolloidzeitschrift," vol. 68 (1934), p. 253 et seq. and Fricke und Lüke "Wärmeinhalt und Gitterzustand aktiver Magnesiumoxyde" in "Zeitschrift für Elektrochemie," vol. 41 (1935), p. 174 et seq.), that the reactivity of magnesium oxide obtained by heating magnesium carbonate or magnesium hydroxide to high temperatures differs depending on the conditions under which it has been produced. In these experiments, the reactivity was expressed in terms of the capability of the magnesium oxide produced, to catalyse the reaction $2CO+O_2 \rightarrow 2CO_2$, or of its heat of hydration; however, the reactivity of magnesium oxide is also of importance in certain other chemical reactions such as e. g. the production of magnesium oxychloride by reaction of magnesia with magnesium chloride lye or with fused hydrates of magnesium chloride; a similar case is the production of anhydrous magnesium chloride by the treatment of magnesia with chlorine in the presence of carbon. As a general result of these observations it was stated that the reactivity of the product is the higher, the lower the temperatures at which the originating material was heated.

The present invention contemplates a process for the production of magnesium oxide having a high chemical reactivity and particularly of a product consisting of particles of uniformly high reactivity. The process may be applied to all magnesium compounds which, under the action of heat, are converted into magnesia.

It has been ascertained that in order to obtain magnesia having the maximum uniform reactivity, it is mainly important to start from originating magnesium compounds which have been ground to a substantially uniform grain size, the size of the individual grains being so small that (a) All parts of the grain, by virtue of the heat imparted to the grain during the heating stage, attain the desired temperature practically simultaneously; in this manner substantial differences in the properties of the elementary particle constituting the grain, which would otherwise occur as a result of the different length of time during which such elementary particles are exposed to the heating temperatures, are avoided.

(b) Maximum reactivity is attained so rapidly that the grain size does not yet become substantially modified; in explanation it may be observed that the increased reactivity takes place the more rapidly, the smaller the grain, and further, that during the heating stage a progressive agglomeration of the individual grains to larger complexes takes place, which, in turn, results in a decrease of reactivity. Requirement (b) therefore means in effect that maximum reactivity, in respect of each individual grain must already be attained before the unavoidable agglomeration of the grains progresses to such an extent as to substantially diminish the reactivity of the product.

When employing originating materials of a uniform grain size determined by the aforesaid requirements, it has been found that the best results, in respect of reactivity of the product, are obtained when applying extremely high heating temperatures, higher than 700° C. up to about 1100° C., the treatment in that case being extended only for so long that at least a substantial, and preferably a practically complete dissociation of carbonic acid or water of hydration, as the case may be, takes place, while at the same time the maximum reactivity, which on further extending the treatment would be impaired, is still preserved.

The basic principles outlined above are somewhat opposed to the conceptions formerly ruling: The latter maintained that low heating temperatures would result in a product having the maximum reactivity, while it has now been found that it is just the extremely high temperatures which lead to this result; moreover it is seen that, provided the originating materials are substantially finely and uniformly ground, it is possible to produce a product combining maximum reactivity with practically complete—or at least substantial—dissociation of carbonic acid and water of hydration; this is achieved by selecting a sufficiently high heating temperature and sufficiently short duration of treatment.

The present invention therefore consists in a process for the production of magnesium oxide of high chemical reactivity, which comprises heating to a temperature from about 800° C. to 1100° C. a magnesium compound of the group consisting of magnesium hydroxide and magnesium carbonate having a substantially uniform grain size which is so small that all parts of the grain, by virtue of the heat transmitted to the grain during the heating stage, attain the desired temperature practically simultaneously and the maximum reactivity is attained so rapidly that the grain size does not yet become substantially modified.

The quality of the products may, in accordance with the present invention, be further substantially improved by removing the product, after dissociation has taken place, as rapidly as possible out of contact with the high temperatures and the gaseous dissociation products.

Several modes of carrying out the invention may be employed in actual practice: Thus it is equally possible to heat-treat the material, ground down to the critical grain size, in a reaction chamber from without and also to resort to internal heating. In each and every case it is only essential to select a suitable combination of temperature and duration of heat treatment. In the latter case it is of particular advantage to inject a stream of the ground originating material into the reaction chamber in the form of a spray by means of a gas which not only acts as a carrier for the material but also, by its own combustion, furnishes the heat required for the treatment.

The grain size which is critical with a view to obtaining products of high reactivity in accordance with the foregoing is of the order of about 10,000 mesh/sq. cm.; this grain size is thus substantially smaller than that obtainable by grinding processes hitherto usually employed on a commercial scale. In order to avoid the effects of a prolonged exposure to the high heat and to the effects of the gaseous dissociation products, the magnesia obtained may be chilled by injecting a cold current of inert gas into the reaction chamber and/or the particles may be precipitated by means of precipitating electrodes.

Examples

1. Into a rotary furnace equipped with a stirring mechanism consisting of two sets of paddles disposed on shafts turning in opposite directions, and heated to 800° C. from without, the furnace having a length of 4 m. and an inner diameter of 0.5 m., 100 kgs. of precipitated magnesium hydroxide, dried at 125° C. and having a grain size below 10,000 meshes per sq. cm., are poured and passed through the furnace while energetically stirring in such a manner that the duration of passage amounts to about 2 minutes. On issuing from the furnace, the product is carried into a closed cooling drum in which it is rapidly chilled. The original water content ($Mg(OH)_2 \rightarrow MgO + H_2O$) of about 30% has been reduced to about 5% in the final product. On contact with magnesium chloride lye of a specific gravity of 1.3, the product sets within 2 minutes, the temperature of the mixture rising to 100° C. in the course of 10 minutes; this indicates that the product possesses an extremely high reactivity.

2. In a similar manner and with the aid of the apparatus described above, 100 kgs. of ground raw magnesite (grain size below 10,000 mesh per sq. cm.) are treated at a temperature of 1100° C. The initial $CO_2$-content of the material which amounted to 42% of the total is thereby reduced to about 10%. The product obtained displays similarly favourable properties to those described above in relation to that obtained from magnesium hydroxide.

3. A rotary tube of 1.5 m. length and 50 mm. internal diameter, provided with an external heat insulating layer, is equipped, at its one end, with a gas bracket protruding over a length of about 300 mm. into the tube in an axial direction, the bracket consisting of an inner tube of 30 mm. diameter and a concentrically disposed external tube of 40 mm. diameter somewhat in the manner of an oxyacetylene blow pipe. The opposite end of the reaction tube extends into a vertically disposed tubular sink of 2 m. length and 200 mm. internal diameter, the upper end of which connects with another vertical tube in which precipitating electrodes are disposed. Through the outer tube of the blow pipe device, 40 cubic metres per minute of illuminating gas of 7700 B. t. u. are injected, while through the inner tube 115 cubic metres per minute of a suspension of magnesium hydroxide in air are blown in; the latter suspension is prepared by grinding magnesium hydroxide to a fineness of below 10,000 mesh per sq. cm. and suspending 150 gms. of the product obtained in every cubic metre of air by means of a rotary plate. The gases issuing from the blow pipe are then ignited. The reaction tube revolves with a speed of about 3 or 4 revolutions per minute. The dehydrated product issuing from the latter enters the tubular sink, in which a small fraction consisting of not completely dehydrated raw material particles sinks to the bottom owing to their higher specific gravity, whilst the bulk of the material consisting of dehydrated particles is carried in an upward direction by means of the combustion gases and precipitated on the precipitating electrodes in the upper extension of the tubular sink. The temperature was measured immediately at the point of ignition at the end of the blow pipe amounts to 1100° C. and the period during which the reaction material remains in the heated zone of the reaction tube is of the order of $\frac{1}{10}$ of a second. On contacting the product obtained with magnesium chloride lye of 1.3 specific gravity, setting takes place immediately (duration of setting immeasurably short), and the temperature of the setting mixture rises to 100° C. within 3 minutes.

What we claim is:

1. The process for the production of magnesium oxide of high chemical reactivity, which comprises heating to a temperature from about 800° C. to 1100° C. a substantially dry magnesium compound of the group consisting of magnesium hydroxide and magnesium carbonate having a substantially uniform grain size below about 10,000 mesh per sq. cm. whereby all parts of the grain, by virtue of the heat transmitted to the grain during the heating stage, attain the desired temperature practically simultaneously and the maximum reactivity is attained so rapidly that the grain size does not yet become substantially modified.

2. The process for the production of magnesium oxide of high chemical reactivity, which comprises heating a substantially dry magnesium compound of the group consisting of magnesim hydroxide and magnesium carbonate, said magnesium compound having a substantially uniform grain size below 10,000 mesh per sq. cm., to a temperature from about 800° C. to about 1100° C. for a period of time from about 1/10 of a second to about 2 minutes.

3. The process for the production of magnesium oxide of high chemical reactivity, which comprises heating a substantially dry magnesium compound of the group consisting of magnesium hydroxide and magnesium carbonate, said magnesium compound having a substantially uniform grain size below 10,000 mesh per sq. cm.., to a temperature from about 800° C. to about 1100° C. for a period of time from about 1/10 of a second to about 2 minutes and immediately removing the magnesium oxide formed from the heat source.

4. The process for the production of magnesium oxide of high chemical reactivity, which comprises heating a substantially dry magnesium compound of the group consisting of magnesium hydroxide and magnesium carbonate, said magnesium compound having a substantially uniform grain size below 10,000 mesh per sq. cm., to 800° C. for about 2 minutes.

5. The process for the production of magnesium oxide of high chemical reactivity, which comprises heating a substantially dry magnesium compound of the group consisting of magnesium hydroxide and magnesium carbonate, said magnesium compound having a substantially uniform grain size below 10,000 mesh per sq. cm., to 1100° C. for a period of 1/10 of a second.

WILHELM MOSCHEL.
WILLI FORST.
WALTHER SCHMID.